Patented July 24, 1951

2,561,897

UNITED STATES PATENT OFFICE 2,561,897

ROTARY CONTACT MODULATOR CIRCUIT

Harry J. White, Cambridge, Mass., assignor, by mesne assignments, to the United States of America as represented by the Secretary of the Navy Application November 29, 1945, Serial No. 631,750

4 Claims. (Cl. 171—97)

This invention relates to a rotary contact modulator, and more particularly, to a modulator having a voltage output whose amplitude is twice the peak value of the input voltage.

In the art, the method of using a condenser to store up large amplitudes of voltage and then discharging this voltage through a load, has provided an effective momentary source of high voltage. Voltage doubling systems used in this method, however, usually require rectifier tubes in a bridge arrangement or specially designed transformer which require complicated circuit arrangements to charge and discharge the storage device.

It is the object of this invention to provide a rotary contact modulator unit for use with a load such as a radar oscillator.

Another object of this invention is to provide a rotary contact modulator capable of producing an output voltage with twice the amplitude of its input voltage.

Another object of this invention is to provide a rotary contact modulator using a storage condenser and then discharging this storage condenser through the load with a rotary contact switch whose frequency is one-half that of the input voltage.

Figure 1:
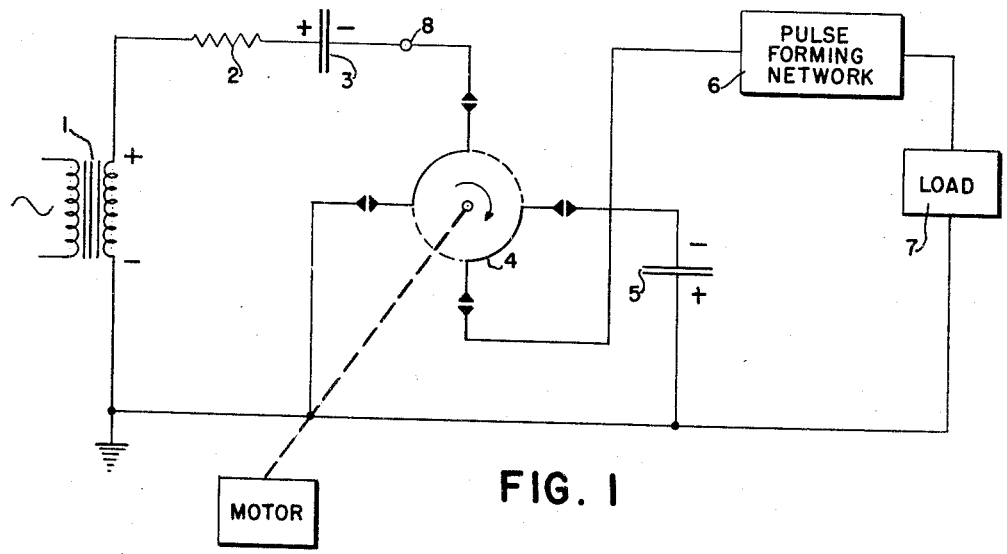
Figure 2:
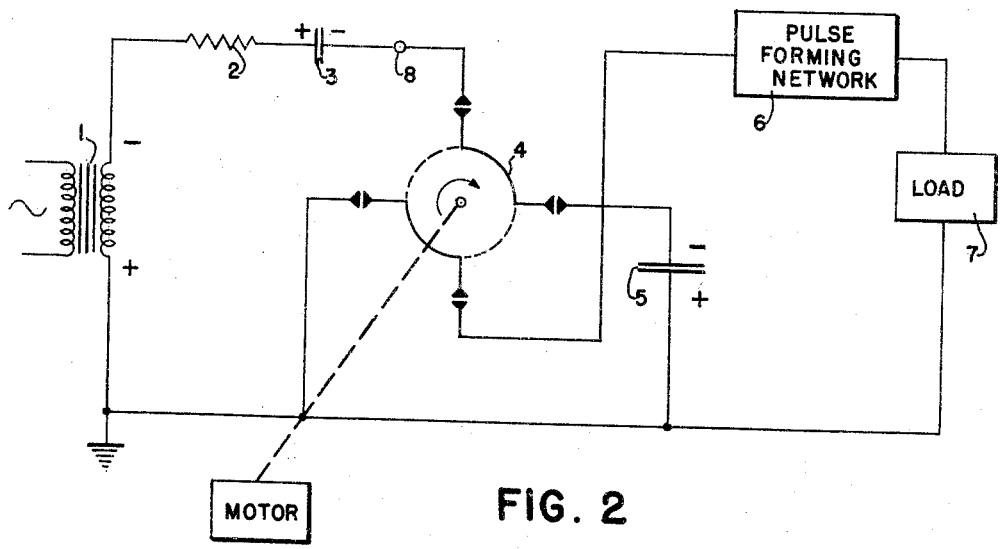

Other and further objects will be apparent upon consideration of the following description, taken together with the accompanying drawings, in which:

Fig. 1 shows a circuit diagram of an embodiment of this invention with the rotary switch in one of two positions; and Fig. 2 shows the same diagram with the rotary switch in the second of two positions.

In Fig. 1, a condenser 3 will be known as a storage condenser, and a condenser 5 will be known as a discharge condenser, and if the storage condenser is much larger than the discharge condenser, the voltage drop across the storage condenser necessary to charge the discharge condenser will be small, and the storage condenser will remain charged near peak amplitude.

In Fig. 1, generally a voltage is impressed on a transformer 1, producing a secondary voltage which is applied through a resistor 2, to a storage condenser 3. The rotary switch 4 then rotates from the position shown in Fig. 1 to the position shown in Fig. 2 whereupon energy from condenser 3 is applied to the discharge condenser 5. The rotary switch again rotates to a position like that shown in Fig. 1, and the voltage stored in the discharge condenser 5 is discharged through a conventional pulse forming network 6 into the load 7. For ease of detailed explanation a voltage monitoring terminal 8 is shown.

Referring again to Fig. 1, and with the rotary switch positioned as shown, a voltage is impressed on the input of the transformer 1, and for a given instant, if the polarity of the secondary is assumed to be positive, the polarity of the voltage across the storage condenser 3 will be as shown. The rotary switch 4 now rotates to the position seen in Fig. 2 at the instant in time when the storage condenser 3 is at a maximum voltage. A charge now flows out of the storage condenser 3 through the rotary switch 4 into the discharge condenser 5 with a polarity as shown. At this same instant of time, the secondary of the transformer 1 has now changed its polarity as shown in Fig. 2 and will have a negative voltage output. We have now the original charge on the storage condenser 3 and another voltage on the secondary of the transformer 1 so polarized as to additively combine with the charge on the storage condenser 3. A voltage from terminal 8 to ground would thus have an amplitude twice that of the input voltage. The discharge condenser is connected by rotary switch 4 to discharge through the pulse forming network 6 to modulate the load 7 while storage condenser 3 is being charged.

At this instant of time when the storage condenser 3 is charged to a maximum the rotary switch 4 again rotates to the position shown in Fig. 2 and this charge will now flow to the discharge condenser 5 and in this second cycle of operation the discharge condenser 5 again receives a charge twice the amplitude of the input voltage from the transformer 1.

The process is thus seen to be continuous, after an initial charging cycle, and the output voltage will be a pulse whose amplitude is twice that of the peak impressed voltage. In order for the action of the circuit to be as described, the rotary switch must be turned by a synchronous motor and its speed of rotation must be equal to one half the frequency of the impressed voltage at the transformer.

The invention is to be limited only by the appended claims.

What is claimed is:

1. An electrical system for energizing the pulse forming network of a pulse modulated microwave radio transmitter comprising a transformer having a primary and a secondary winding, a source of alternating current for energizing said primary winding, a storage capacitor, a discharge capacitor, a load, means for charging said storage capacitor from said transformer secondary winding during one half cycle of said alternating current source, means for charging said discharge capacitor from said storage capacitor and said transformer secondary winding in series connection during the next half cycle of said alternating current source, and means to discharge said discharge capacitor into said load during the charging period of said storage capacitor.

2. An electrical system for energizing the pulse forming network of a pulse modulated microwave radio transmitter comprising a storage capacitor, a discharge capacitor, a pulse forming network, a load for said network, a source of alternating current, a transformer having primary and secondary windings, means to energize said primary winding from said source, means for charging said storage capacitor from said transformer secondary winding during one half cycle of said alternating current source, means for charging said discharge capacitor from said storage capacitor and said secondary winding in series connection during the next half cycle of said source, and means to energize said pulse forming network from said discharge capacitor during the charging period of said storage capacitor.

3. An electrical system for energizing the pulse forming network of a pulse modulated microwave radio transmitter comprising a storage capacitor, a discharge capacitor, a pulse forming network, a load for said network, a source of alternating current, a transformer having primary and secondary windings, means to energize said primary winding from said source, means for charging said storage capacitor from said transformer secondary winding during one half cycle of said alternating current source, means for charging said discharge capacitor from said storage capacitor and said secondary winding in series connection during the next half cycle of said source, means to energize said pulse forming network from said discharge capacitor during the charging period of said storage capacitor, and means for discharging said pulse forming network through said load during the charging period of said discharge capacitor.

4. An electrical system for energizing the pulse forming network of a pulse modulated microwave radio transmitter comprising a transformer having a primary winding and a secondary winding, a source of alternating current for energizing said primary winding, a storage capacitor, a discharge capacitor, a pulse forming network, a load, and a rotary switch adapted to connect said storage capacitor to said transformer secondary winding to charge said storage capacitor and to connect said discharge capacitor through said load to energize said pulse forming network during one half cycle of said alternating current source and adapted to connect said discharge capacitor to charge from said storage capacitor and said transformer secondary winding in series connection and to discharge said pulse forming network through said load during the remaining half cycle of said alternating current source.

HARRY J. WHITE.

REFERENCES CITED

The following references are of record in the file of this patent:

UNITED STATES PATENTS

| Number | Name | Date |
|---|---|---|
| 1,508,162 | Chubb | Sept. 9, 1924 |
| 1,553,364 | Chubb | Sept. 15, 1925 |
| 1,992,908 | Cockroft et al. | Feb. 26, 1935 |